United States Patent
Bauduin et al.

(10) Patent No.: US 12,111,416 B2
(45) Date of Patent: Oct. 8, 2024

(54) METHOD FOR ROBUST RADAR DETECTION AND DIGITALLY MODULATED RADAR

(71) Applicant: Imec vzw, Leuven (BE)

(72) Inventors: Marc Bauduin, Brussels (BE); Andre Bourdoux, Theux (BE)

(73) Assignee: Imec vzw, Leuven (BE)

( * ) Notice: Subject to any disclaimer, the term of this patent is extended or adjusted under 35 U.S.C. 154(b) by 548 days.

(21) Appl. No.: 17/526,627

(22) Filed: Nov. 15, 2021

(65) Prior Publication Data

US 2022/0155433 A1     May 19, 2022

(30) Foreign Application Priority Data

Nov. 17, 2020 (EP) .................... 20208013

(51) Int. Cl.
    *G01S 7/35*     (2006.01)
    *G01S 13/32*     (2006.01)
    *G01S 13/58*     (2006.01)

(52) U.S. Cl.
    CPC .............. *G01S 7/354* (2013.01); *G01S 7/358* (2021.05); *G01S 13/325* (2013.01); *G01S 13/58* (2013.01)

(58) Field of Classification Search
    CPC ........ G01S 7/354; G01S 7/358; G01S 13/325; G01S 13/58
See application file for complete search history.

(56) References Cited

U.S. PATENT DOCUMENTS

| | | | |
|---|---|---|---|
| 2015/0341203 A1* | 11/2015 | Morita | G01S 7/288 375/282 |
| 2017/0299711 A1* | 10/2017 | Kishigami | G01S 13/5242 |
| 2020/0191940 A1* | 6/2020 | Wu | H04B 7/0413 |
| 2020/0209347 A1* | 7/2020 | Schroder | G01S 7/0233 |

FOREIGN PATENT DOCUMENTS

EP      3627787 A1      3/2020

OTHER PUBLICATIONS

Extended European Search Report and Written Opinion, Application No. EP20208013.1, mailed May 17, 2021, 7 pages.
Schweizer, Benedikt, Christina Knill, Daniel Schindler, and Christian Waldschmidt. "IQ—Imbalance Compensation for Wideband OFDM-Radar." In 2020 14th European Conference on Antennas and Propagation (EuCAP), pp. 1-5. IEEE, 2020.

* cited by examiner

*Primary Examiner* — Freshteh N Aghdam
(74) *Attorney, Agent, or Firm* — McDonnell Boehnen Hulbert & Berghoff LLP

(57) ABSTRACT

A method for facilitating robust radar detection comprises generating a radar signal in a digital domain along at least one transmission path, the radar signal comprises a number of M periodic repetitions of a code sequence with a length Lc, multiplied with a progressive phase rotation $e^{j\pi/K \cdot n}$, where Lc and M are integers, K is an integer or a non-integer, and n is a discrete time index corresponding to a code rate. The method further comprises generating a process input signal in the digital domain along at least one receiving path from a digitized reflection signal corresponding to the radar signal by multiplying the digitized reflection signal with a progressive phase rotation $e^{-j\pi/K \cdot n}$. In this context, K is defined such that a ratio Lc/2·K is a non-integer, and M is defined such that a ratio Lc·M/2·K is an integer.

20 Claims, 10 Drawing Sheets

METHOD FOR ROBUST RADAR DETECTION AND DIGITALLY MODULATED RADAR

CROSS-REFERENCE TO RELATED APPLICATIONS

The present application is a non-provisional patent application claiming priority to European Patent Application No. 20208013.1, filed Nov. 17, 2020, the contents of which are hereby incorporated by reference.

FIELD OF THE DISCLOSURE

The present disclosure relates to radar signal generation and reception, especially in digitally modulated radars, in order to facilitate robustness to non-idealities associated with radar transceivers.

BACKGROUND

Digitally modulated radars are now becoming prominent due to their inherent capability of being programmed for different applications and their ability to perform subsequent processing by digital signal processing techniques. Theoretically, those radars are able to combine high sensitivity (i.e., being able to detect small targets) with high resolution high unambiguous velocity (i.e., being able to estimate target relative velocity without ambiguity). However, the non-idealities associated with the radar transceivers drastically degrade the radar's performance. For instance, the presence of DC offset in the received signal, the presence of non-linearity in the baseband signal, any mismatch between I and Q signal components, and the like will allow artifacts to be generated, e.g., range sidelobes or ghosts in radar range profiles as well as in range-Doppler maps.

In a conventional radar system, the DC offset is required to be estimated in order to attenuate or compensate it, which is a complex process that requires additional hardware and/or software support. Furthermore, some code sequences, e.g., Zadoff code sequence, are very sensitive to the third-order harmonic distortion introduced by the non-linearity in the baseband signal. Moreover, techniques for IQ imbalance robustness are only known for OFDM radars but not for all digitally modulated radars, e.g., a phase modulated continuous wave (PMCW) radar.

For example, EP3627787A1 presents a radar detection technique that is robust to IQ imbalance. In particular, EP3627787A1 discloses the generation of an OFDM radar signal that is robust to IQ imbalance based on specific symmetry properties in the sub-carrier domain.

SUMMARY

An aspect of the disclosure provides a method and a digitally modulated radar for facilitating radar detection robust to conventional front-end non-idealities, which can address the aforementioned limitations. In view of this, embodiments of this application aim to provide an improved radar detection scheme and a digitally modulated radar.

These and other aspects are achieved by the embodiments of this application as described in the enclosed independent claims. Further implementations of the embodiments are further defined in the dependent claims.

According to a first aspect of this application, a method is provided for facilitating robust radar detection. The method comprises the step of generating a radar signal in the digital domain along at least one transmission path, the radar signal comprises a number of M periodic repetitions of a code sequence with a length Lc, multiplied with a progressive phase rotation $e^{j\cdot\pi/K\cdot n}$, where Lc and M are integers, K is an integer or a non-integer, and n is a discrete time index corresponding to a code rate. The method further comprises the step of generating a process input signal in the digital domain along at least one receiving path from a digitized reflection signal corresponding to the radar signal by multiplying the digitized reflection signal with a progressive phase rotation $e^{-j\cdot\pi/K\cdot n}$. In this context, K is defined such that a ratio Lc/2·K is a non-integer, and M is defined such that a ratio Lc·M/2·K is an integer. Additionally or alternatively, K is defined such that a ratio 2·Lc/K is a non-integer, and M is defined such that a ratio 2·Lc·M/K is an integer, if the code sequence is a Zadoff code sequence.

Therefore, the disclosure presents a simplified technique to generate radar signals that is robust to front-end non-idealities. The disclosure further presents simplified processing of radar detections from the radar signals, where the signal generation and the signal processing are not limited to the type of the radar. Moreover, this disclosure presents criteria for signal processing to achieve robust radar detection that is not limited to the type of modulation scheme used in a digitally modulated radar.

In this regard, the constraints that have to be maintained are only limited to the factors such as code sequence length Lc, and to the variables such as K and M, which can be defined or selected irrespective of the type of code sequence and/or modulation scheme. In addition to this or as an alternative, this disclosure presents criteria for signal processing to achieve robust radar detection that can be implemented for a specific code sequence, namely the Zadoff code sequence.

In an implementation form of the first aspect, the method further comprises the step of defining K such that a ratio $$\frac{Lc}{K}$$

is a non-integer and defining M such that a ratio $$\frac{Lc\cdot M}{K}$$

is an integer. Therefore, the disclosure further presents criteria for signal processing to achieve robust radar detection that is not limited to the type of modulation scheme used in a digitally modulated radar in order to address additional non-idealities of the front-end.

In an implementation form of the first aspect, if the code sequence corresponds to a binary code sequence, e.g., the modulation corresponds to binary phase shift keying (BPSK), the method further comprises the step of defining K as an integer or a non-integer given by:

$$K = \frac{\pm 3}{1+3d}$$

where d is an integer.

Therefore, the disclosure further presents a modulation specific (BPSK) implementation to address additional non-idealities of the front-end. In particular, the disclosure additionally addresses the power amplifier non-linearity and further proposes a radar signal generation and processing scheme that is robust to the non-linearity. The power amplifier non-linearity especially results from non-linear distortions introduced in the amplification stages of the front-end, e.g., in the power amplifier, and further introduces unwanted artifacts, e.g., range sidelobes or ghosts, in the range profiles.

In an implementation form of the first aspect, the method further comprises the step of performing digital processing of the process input signal with respect to the code sequence in order to generate a succession of range profiles. In addition, the method further comprises the step of accumulating a number of M consecutive range profiles. The digital processing or range processing or process algorithm can be defined based on the type of radar, for example. For a PMCW radar, the range processing can be based on a correlation algorithm. For an OFDM radar, the process algorithm can be an FFT-based algorithm (frequency domain processing).

In general, the radar signal comprises periodic repetitions of the code sequence and the reflection signal generally comprises a linear combination of delayed versions of the code sequence. This delay is proportional to the target range location. In order to estimate the delay, the radar performs the range processing on the received reflected signal to produce a range profile (e.g., correlation with the complex conjugate of the transmitted code sequence in case of PMCW radars). The range profile contains a peak at the location of each target, which is proportional to the power reflected back from the targets. In addition, the accumulation of multiple consecutive range profiles (e.g., a number of M range profiles) facilitates improvement of the signal-to-noise ratio, for example.

In an implementation form of the first aspect, the method further comprises the step of generating the radar signal comprising a plurality of periodic repetitions of the number of M periodic repetitions of the code sequence. Specifically, the radar signal may comprise a number of N periodic repetitions of the number of M periodic repetitions of the code sequence, where N is an integer. In addition, the method further comprises the step of processing a number of N range profiles in order to produce a range-Doppler map. In other words, the number of repetitions N defines the number of samples used for Doppler processing in order to estimate the target velocity.

In an implementation form of the first aspect, the method further comprises the step of generating a plurality of the radar signals in the digital domain along a plurality of transmission paths, each of the radar signals comprises an identical code sequence length, an identical number of periodic repetitions of the code sequence, and a non-identical progressive phase-rotation with respect to the plurality of the radar signals, whereby each of the transmission paths being associated with a dedicated radar signal of the plurality of the radar signals. In this regard, the orthogonality between the radar signals of each of two of the corresponding plurality of transmission paths is satisfied by:

$$\sum_{m=0}^{M-1} e^{jn\left(\frac{1}{K_p}-\frac{1}{K_q}\right)\frac{mL_c}{M}} = 0$$

where $K_p$ is an integer or a non-integer for a first transmission path and $K_q$ is an integer or a non-integer for a second transmission path.

In addition, the method further comprises the step of generating a plurality of the process input signals in the digital domain along a plurality of receiving paths, each of the receiving paths being associated with a process input signal generated from a digitized reflection signal corresponding to the respective dedicated radar signals of the plurality of transmission paths.

Therefore, the disclosure further presents a multi-input multi-output (MIMO) scheme for digitally modulated radars. The disclosure further presents a solution to effectively allow the receiver to differentiate the signal or signals coming from each of the transmitters.

According to a second aspect of this application, a digitally modulated radar is provided for facilitating robust radar detection. The digitally modulated radar comprises at least one code generation unit configured to generate a radar signal in the digital domain along at least one transmission path, the radar signal comprises a number of M periodic repetitions of a code sequence with a length Lc, multiplied with a progressive phase rotation $$e^{j\cdot\frac{\pi}{K}\cdot n},$$

where Lc and M are integers, K is an integer or a non-integer, and n is a discrete time index corresponding to a code rate.

The digitally modulated radar further comprises at least one processing unit configured to generate a process input signal in the digital domain along at least one receiving path from a digitized reflection signal corresponding to the radar signal by multiplying the digitized reflection signal with a progressive phase rotation $$e^{-j\cdot\frac{\pi}{K}\cdot n}.$$

In this context, the at least one code generation unit is further configured to define K such that a ratio $$\frac{Lc}{2\cdot K}$$

is a non-integer, and to define M such that a ratio $$\frac{Lc\cdot M}{2\cdot K}$$

is an integer. Additionally or alternatively the at least one code generation unit is further configured to define K such that a ratio $$\frac{2\cdot Lc}{K}$$

is a non-integer, and to define M such that a ratio $$\frac{2.Lc.M}{K}$$

is an integer, if the code sequence is a Zadoff code sequence.

In an implementation form of the second aspect, the at least one code generation unit is further configured to define K such that a ratio $$\frac{Lc}{K}$$

is a non-integer, and to define M such that a ratio $$\frac{Lc.M}{K}$$

is an integer.

In an implementation form of the second aspect, if the code sequence corresponds to a binary code sequence, the at least one code generation unit is further configured to define K as an integer or a non-integer given by:

$$K = \frac{\pm 3}{1 + 3d}$$

where d is an integer.

In an implementation form of the second aspect, the at least one processing unit is further configured to perform digital processing of the process input signal with respect to the code sequence in order to generate a succession of range profiles. In this regard, the at least one processing unit is further configured to accumulate a number of M consecutive range profiles.

In an implementation form of the second aspect, the at least one code generation unit is configured to define Lc with respect to the maximum unambiguous range of the radar for the code rate. Alternatively, the at least one code generation unit may define Lc with respect to the maximum unambiguous range of the radar for a given radar bandwidth. In this regard, the maximum unambiguous range of the radar is defined as the maximum range the radar can cover without ambiguity. In an example, the radar bandwidth is defined based on a preferred range resolution, i.e., the measurement of smallest distance of separation of its targets. Moreover, the maximum unambiguous range depends on the code sequence, specifically on the code sequence duration, which is a function of the code rate or the radar bandwidth.

In an implementation form of the second aspect, the digitally modulated radar comprises a plurality of transmission paths, each of the transmission paths comprises the at least one code generation unit. In addition, for each of the transmission paths, the respective code generation unit is configured to generate a dedicated radar signal in the digital domain having an identical code sequence length, an identical number of periodic repetitions of the code sequence, and a non-identical progressive phase rotation with respect to the plurality of transmission paths. In this context, the orthogonality between the radar signals of each of two of the corresponding plurality of transmission paths is satisfied by:

$$\sum_{m=0}^{M-1} e^{j\pi \left(\frac{1}{K_p} - \frac{1}{K_q}\right)\frac{mL_c}{M}} = 0$$

where $K_p$ is an integer or a non-integer for a first transmission path and $K_q$ is an integer or a non-integer for a second transmission path.

Furthermore, the digitally modulated radar comprises a plurality of receiving paths, each of the receiving paths comprises the at least one processing unit. In addition, for each of the receiving paths, the respective processing unit is configured to generate a process input signal in the digital domain from a digitized reflection signal corresponding to the respective dedicated radar signals of the plurality of transmission paths.

It is to be noted that the digitally modulated radar according to the second aspect corresponds to the method according to the first aspect and its implementation forms. Accordingly, the digitally modulated radar of the second aspect achieves the same effects as the method of the first aspect and its respective implementation forms, and vice versa.

BRIEF DESCRIPTION OF THE FIGURES

The above, as well as additional features, will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Reference will now be made in detail to the embodiments of the present disclosure, examples of which are illustrated in the accompanying drawings. However, the following embodiments of the present disclosure may be variously modified and the range of the disclosure is not limited by the following embodiments. Reference signs for similar entities in different embodiments are partially omitted.

Figure 1:
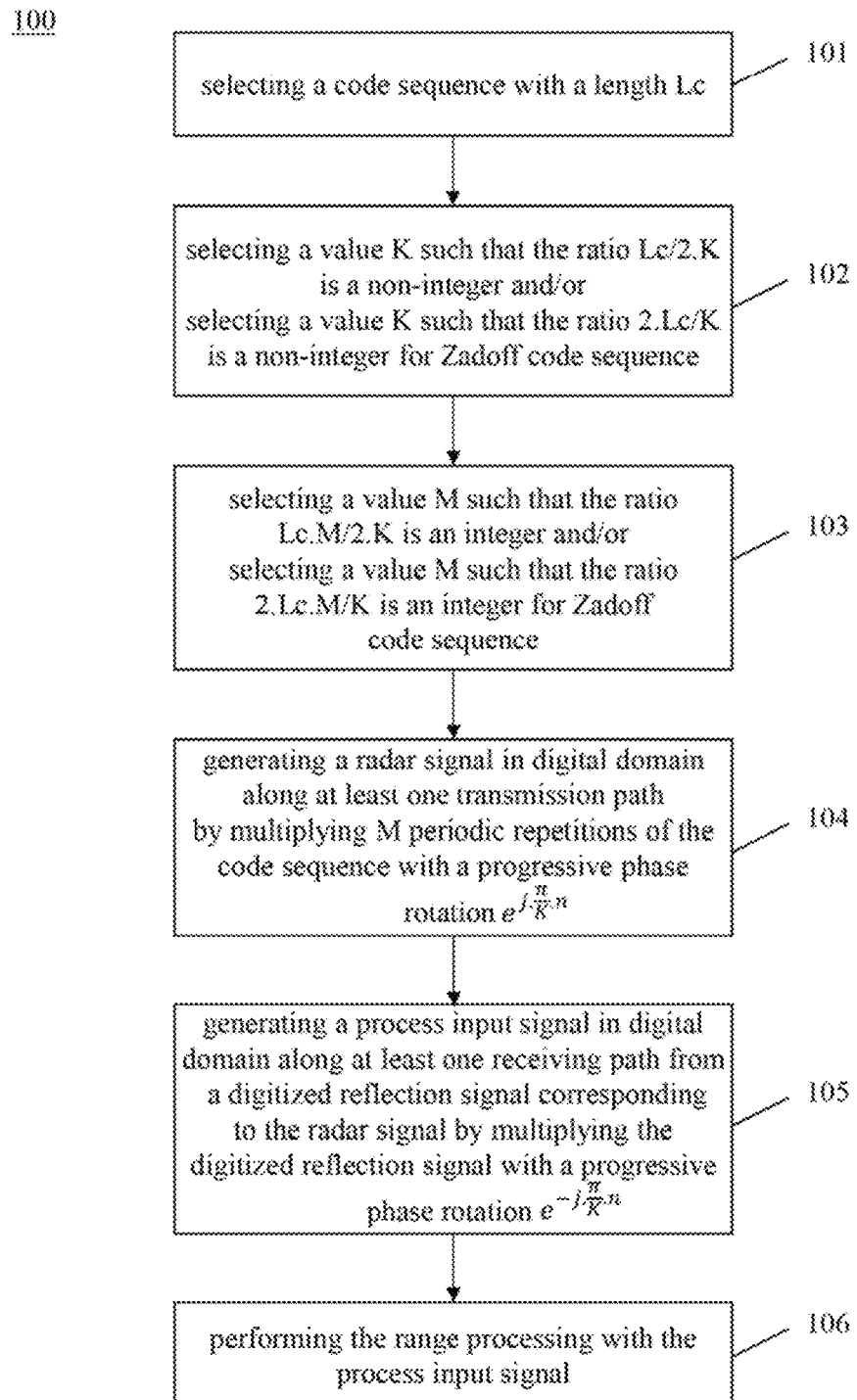
FIG. 1 shows a method, in accordance with example embodiments.

In FIG. 1, an example of an embodiment of the method 100 according to the first aspect of this disclosure is illustrated. In a first step 101, a code sequence with a code sequence length Lc is selected. In a second step 102, a value for a parameter K is selected such that a ratio Lc/2·K is a non-integer. Additionally or alternatively, in the second step 102, a value for the parameter K is selected for Zadoff code sequence such that a ratio 2·Lc/K is a non-integer. In a third step 103, a value for a parameter M is selected such that a ratio Lc·M/2·K is an integer. Additionally or alternatively, in the third step 103, a value for the parameter M is selected for Zadoff code sequence such that a ratio 2·Lc·M/K is an integer.

In a fourth step 104, a radar signal is generated in the digital domain by multiplying M periodic repetitions of the code sequence, and in an example, N periodic repetitions of M periodic repetitions of the code sequence, with a progressive phase rotation $$e^{j \cdot \frac{\pi}{K} \cdot n}.$$

In a fifth step 105, a process input signal is generated in the digital domain from a digitized reflection signal corresponding to the radar signal by multiplying the digitized reflection signal with a progressive phase rotation $$e^{-j \cdot \frac{\pi}{K} \cdot n}.$$

In a sixth step 106, range processing is performed with the process input signal.

In other words, the radar signal is generated by multiplying the periodic repetitions of the code sequence with a progressive phase rotation. The process input signal is generated by multiplying the digitized reflection signal of the radar signal, hereinafter referred to as the reflection signal for simplicity, with a progressive phase rotation that has an opposite rotational angle to the former. In this regard, the discrete time index is maintained identical for both progressive phase rotations at a given time instance. The aforementioned criteria for the parameters Lc, M, and K may require to be satisfied individually based on the desired code sequence and may require to be satisfied in combination exclusively for the Zadoff code sequence.

The range processing generally comprises the generation of range profiles. In this regard, the method comprises successive steps of range processing of the process input signal with respect to the code sequence in order to generate a succession of range profiles and further accumulating M consecutive range profiles to improve SNR.

Figure 2:
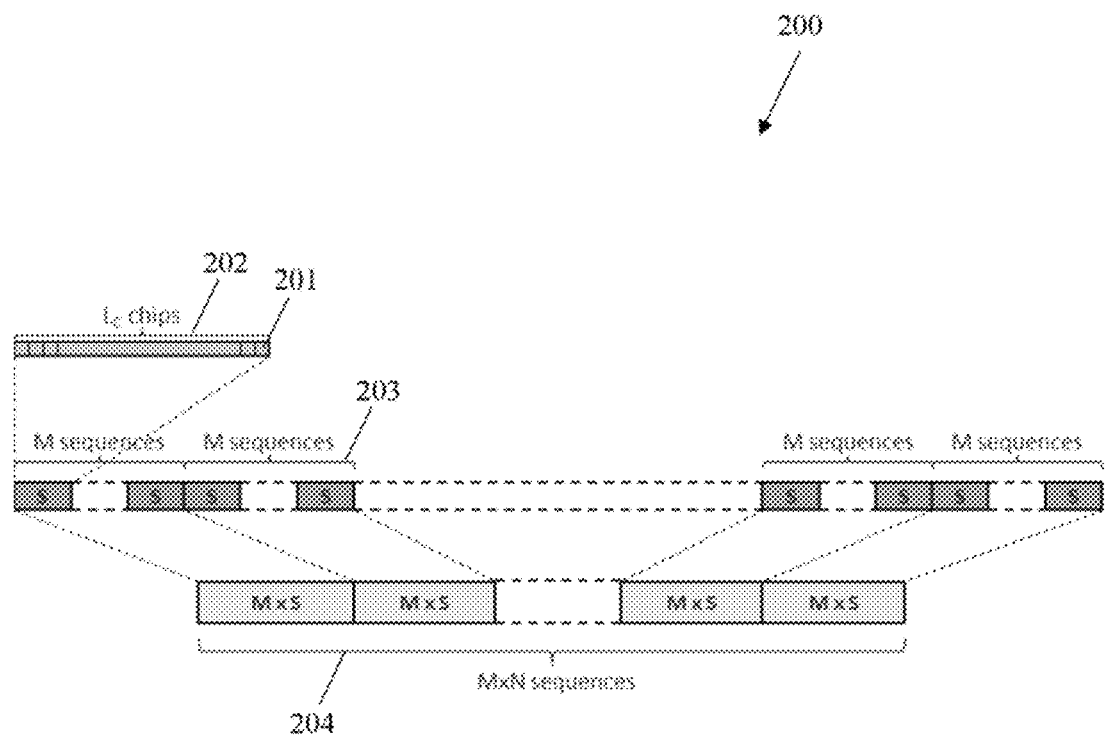
FIG. 2 shows a transmission frame for the acquisition of one radar data cube, in accordance with example embodiments.

In FIG. 2, an example of a transmission frame 200 for the acquisition of one radar data cube is illustrated. The transmission frame 200 is shown as a conventional transmission frame for a single-input-single-output (SISO) digitally modulated radar (e.g., SISO-PMCW radars or SISO-OFDM radars). The code sequence length Lc defines the number samples or chips 201 in the code sequence 202, as denoted herein as "s". In other words, the code sequence length Lc defines the number of range bins for the range processing operation. Thus, the so-called pulse repetition frequency for a digitally modulated radar can be defined as the sequence of length Lc repeating itself with a chip rate fc, for example.

The parameter M defines the number of repetitions 203 of the same code sequence "s" that are accumulated, analogous to the conventional pseudorandom code sequences such as the maximum length sequence (MLS). In other words, the number of repetition M defines the number of range profiles to be coherently accumulated. The parameter N defines the number of repetitions 204 of M sequences 203, i.e., the number of samples for Doppler processing in order to estimate the target velocity. Therefore, the code sequence "s" is repeated M·N times in the transmission frame 200 for the acquisition of one radar data cube.

During the detection phase, the transmission signal is reflected from all targets or obstacles in front of the radar. This produces a linear combination of delayed versions of the code sequence "s". This delay is proportional to the target range location. In order to estimate the delay, the received signal is digitally processed, e.g., correlated in PMCW radars, with the transmitted code sequence "s", e.g., for binary code sequence, or with the complex conjugate of the transmitted code sequence "s", e.g., for complex code sequence. This produces a range profile that contains a peak at the location of each target, which is proportional to the power reflected back from the targets.

Figure 3A:
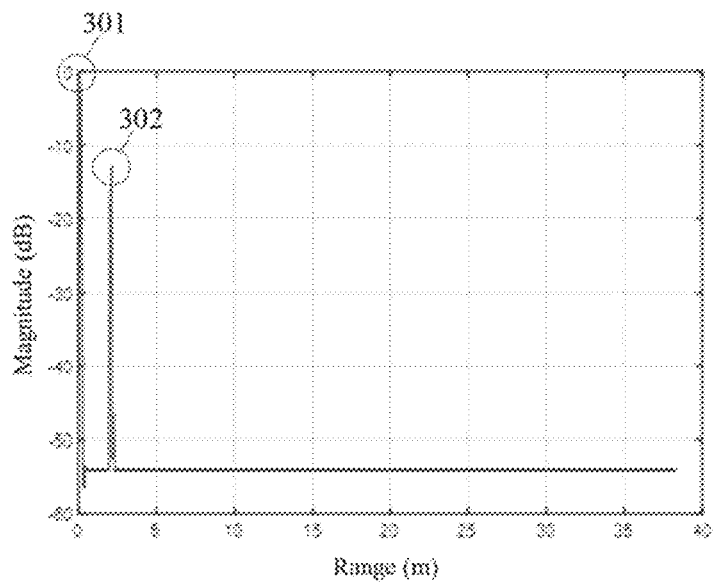
FIG. 3A shows an ideal M-sequence range profile with two targets, in accordance with example embodiments.
Figure 3B:
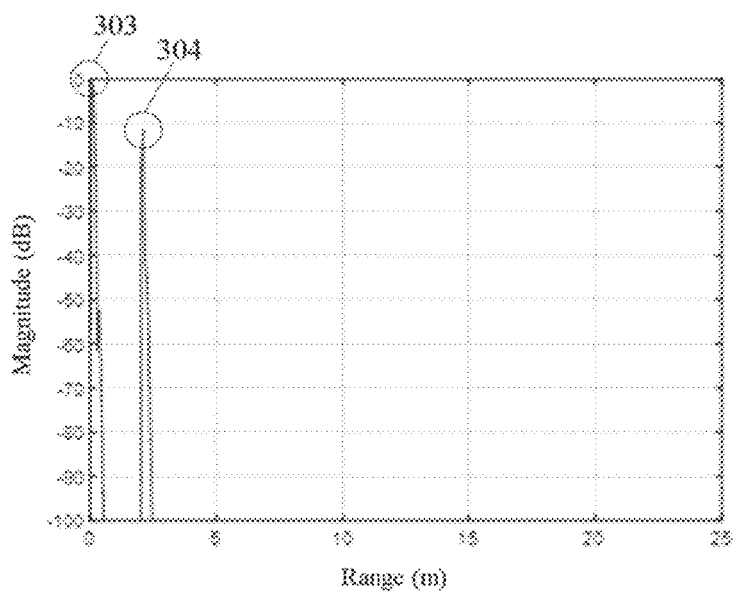
FIG. 3B shows an ideal APS range profile with two targets, in accordance with example embodiments.

Along FIGS. 3A and 3B, examples range profiles are illustrated for an ideal radar transceiver. In particular, FIG. 3A shows an ideal range profile with two targets for M-sequence (MLS). The horizontal axis denotes the range of the targets in meters and the vertical axis denotes the reflected power magnitude in decibels. Here, the two targets are indicated at the respective peaks with circles 301 and 302. On the other hand, FIG. 3B shows an ideal range profile with two targets for an almost perfect sequence (APS). The horizontal axis denotes the range of the targets in meters and the vertical axis denotes the reflected power magnitude in decibels. Here, the two targets are indicated at the respective peaks with circles 303 and 304.

Ideally, the produced range profile should contain zeros in the range bins, which do not correspond to any target. In practice, some non-null value may appear coming from the code sequence property. Those values are called range sidelobes. For example, in the case of PMCW radar, a M-sequence always produces range sidelobes which are −20 log 10(Lc) dB below the correlation peak as shown in FIG. 3A, where Lc is the code sequence length or the number of samples in the code sequence. On the other hand, an APS does not produce any sidelobes, as shown in FIG. 3B. An ideal code sequence should have the following property:

$$\sum_{n=0}^{L_c-1} b_c(n) b_c^*(n+D) = \begin{cases} L_c & D = 0 \\ 0 & D \neq 0 \end{cases} \quad (1)$$

where $b_c(n)$ is the code sequence in the digital domain, D is a circular shift in the code sequence which correspond to the target range and ( )* is the complex conjugate operation.

The number of samples Lc in the code sequence $b_c(n)$ defines the number of range bins in the range profile. In order to cover a long range, high value of Lc is required. The code sequence is repeated continuously to produce the signal b(n), e.g., M·N times repetition as shown in FIG. 2. For example, in the case of PMCW radar, each of those repetitions produces a range profile defined by:

$$r_{m,k}(D) = \sum_{n=0}^{L_c-1} u(n + mL_c + kML_c) b_c^*(n + D) \quad (2)$$

where u(n) is the received signal at ADC output, m=0, . . . , M−1 and k=0, . . . , N−1.

Generally, the choice of sequence "s" depends on the type of digitally modulated radar, such as a phase modulated continuous wave (PMCW) based radar or an orthogonal frequency division modulation (OFDM) based radar. However, OFDM radars use the same frame structure. The only difference with PMCW is the range processing operation.

In the case of PMCW radar, the range processing is performed with the help of correlation. Therefore, the code sequence selection depends on the periodic auto-correlation property of the code sequence as defined in equation (1). Hence, the code sequences that satisfy the above-mentioned auto-correlation property are selected. In this regard, APS and M-sequences are exemplified in this disclosure, which perfectly satisfies the above-mentioned auto-correlation property. Particularly, APS produces two non-zero values in the range profile instead of only one non-null value and M-sequences give an amplitude of 1 instead of 0 when Δ≠0.

In the case of OFDM radar, the range processing is performed with a similar processing as OFDM channel equalization in wireless communication. This operation extracts the range profile in the frequency domain and removes the code sequence itself. Therefore, every sequence of Lc complex samples can be used and hence, there is no constraint on the value of the complex samples.

As already mentioned above, M consecutive range profiles are accumulated to improve the Signal-to-Noise Ratio (SNR), while the Doppler processing is achieved by Discrete Fourier Transforms (DFT) along the slow time, i.e., N repetitions of M code sequences. If multiple antennas are used, multi-input multi-output (MIMO) techniques can also be applied.

Generally, M consecutive range profiles $r_{m,k}(D)$ of Lc range bins can be accumulated to produce a range profile $r_k(D)$ with improved SNR.

$$r_k(D) = \sum_{m=0}^{M-1} r_{m,k}(D) \quad (3)$$

where D is the range bin index.

In this regard, $r_{m,k}(D)$ is the value of one range bin, where the range profile is the collection of all range bins $r_{m,k}(D)$ for all values of D=0, 1, . . . , Lc−1. Similarly, $r_k(D)$ is the value of one range bin, where the range profile is the collection of all range bins $r_k(D)$ for all values of D=0, 1, . . . , Lc−1.

Each group of M code sequences is repeated N times. Those repetitions are used to compute the Doppler profile for each range bin with the help of a Discrete Fourier Transform (DFT):

$$R(D, l) = \sum_{k=0}^{N-1} r_k(D) e^{-j2\pi \frac{kl}{N}} \quad (4)$$

where l is the Doppler bin index.

R(D, l) is called the range-Doppler map and is the value of one range-Doppler cell. The range-Doppler map is the collection of all range-Doppler cells R(D, l) for all values of D=0, 1 . . . , Lc−1; and l=0, 1, . . . , N−1. It therefore contains, for each range bin D, a Doppler profile defined by the index l. Each index l is a Doppler bin corresponding to a Doppler frequency shift due to the target relative velocity.

To observe high speed targets, the radar has to be able to observe high Doppler frequency shifts. This latter is limited by the parameters Lc, M and Tc where Tc is the chip rate given by:

$$f_{max} = \frac{1}{2L_c M T_c} \quad (5)$$

This value is also called ambiguous Doppler. The product $L_c M T_c$ gives the duration of M code repetitions.

With an ideal transceiver, the response to a point target creates a sharp peak in the range profile or range-Doppler map, possibly limited by the theoretical sidelobes of the code sequence. However, with a non-ideal transceiver, the ideal response is degraded, which typically manifests itself by the appearance of ghost targets or an increase of the sidelobes. Typical sources of non-idealities are power amplifier non-linearity, IQ mismatch, receiver DC offset or baseband non-linearity.

The sources of the non-idealities can be exemplified for a conventional radar transceiver. For example, the IQ mismatch or imbalance may occur in the mixer present on both transmitter side and receiver side. The power amplifier non-linearity may occur in the power amplifier on transmitter side. The baseband non-linearity may occur after and/or before the domain conversion (digital-to-analog and analog-to-digital) of the respective signals on the transmitter side and the receiver side, respectively. The baseband non-linearity may correspond to second order harmonic distortion and/or to third order harmonic distortion.

However, the receiver DC offset has several origins. As this is an additive process, the impact of all sources of DC offset can be combined, e.g., in a coefficient γ which will be described later in this disclosure.

Furthermore, if multiple antennas are used, multi-input multi-output (MIMO) techniques can be incorporated. An important challenge with MIMO is to allow the receiver to differentiate the signal coming from each transmitter. For example, in the case of a time domain MIMO, each transmitter transmits the same signal in a different time slot before going to the next slow-time point. Hence, an increase in the number of transmitters degrades the Doppler ambiguity. On the other hand, in the case of a Doppler domain MIMO, each transmitter appears in a different part of the Doppler profile. This means that each target will appear $N_{tx}$ times in the Doppler profile if there are $N_{tx}$ transmitters. This makes the detection more complex and we can show that it also degrades the ambiguous Doppler frequency shift. In general, the ambiguous Doppler in MIMO radars can be expressed as:

$$f_{max,MIMO} = \frac{1}{2N_{tx} L_c M T_c} \quad (6)$$

where $N_{tx}$ is the number of transmitters.

Figure 4:
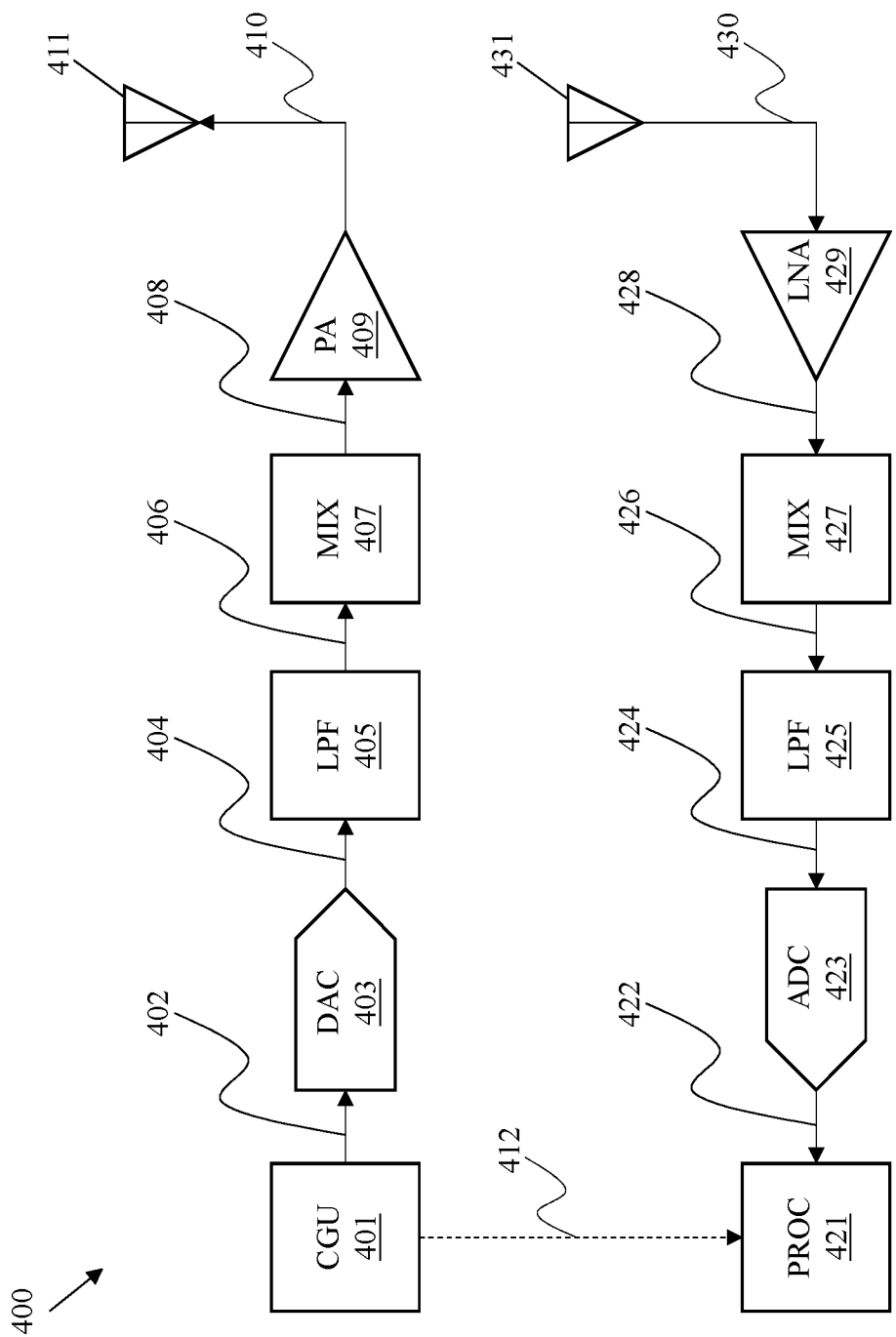
FIG. 4 shows a first embodiment of a radar transceiver according to an aspect of this disclosure, in accordance with example embodiments.

In FIG. 4, a first example embodiment of the digitally modulated radar 400 according to the second aspect of this disclosure is illustrated. Particularly, the digitally modulated radar 400 is illustrated in terms of a single-input single-output (SISO) implementation. The digitally modulated radar 400 comprises a code generation unit (CGU) 401 that generates a radar signal 402 in the digital domain. A digital-to-analog converter (DAC) 403 downstream to the CGU 401 converts the digital radar signal 402 in the analog domain thereby generating an analog radar signal 404. A low pass filter (LPF) 405 downstream to the DAC 403 performs baseband filtration of the analog radar signal 404, i.e., filtering out higher frequency components, thereby generating a filtered radar signal 406.

A frequency mixer 407 downstream to the LPF 405 modulates the filtered radar signal 406 with a carrier sinewave, and in an example, generated by a local oscillator (not shown), thereby generating an RF radar signal 408. An amplifier, especially a power amplifier (PA) 409 amplifies the RF radar signal 408, thereby generating a radar transmit signal 410, which is transmitted via a transmit antenna 411. Therefore, a transmission path for transmitting the radar signal 402 may comprise the DAC 403, the LPF 405, the frequency mixer 407, the PA 409, and optionally the CGU 401 and the transmit antenna 411.

The radar transmit signal 410 is normally reflected from all targets and the resulting echo or reflected signal or radar receive signal 430 is received by a receive antenna 431. Generally, only a portion of the transmit signal 410 is reflected back to the receive antenna 431. An amplifier, especially a low noise amplifier (LNA) 429 amplifies the radar receive signal 430, thereby generating an amplified radar receive signal 428. A frequency mixer 427 downstream to the LNA 429 demodulates the amplified radar receive signal 428 with the carrier signal generated by the local oscillator, i.e., direct conversion of the amplified radar receive signal 428, thereby generating a baseband signal 426.

A low pass filter (LPF) 425 downstream to the frequency mixer 427 filters the baseband signal 426, thereby generates a filtered baseband signal 424. An analog-to-digital converter (ADC) 423 downstream to the LPF 425 converts the filtered baseband signal 424 into the digital domain, thereby generating a reflection signal 422 in the digital domain corresponding to the radar signal 402 generated by the CGU 401 in the digital domain. The digitally modulated radar 400 further comprises a processing unit 421 downstream to the ADC 423 that generates a process input signal in the digital domain from the reflection signal 422 in order to perform range and Doppler processing. Therefore, a reception path or a receiving path for receiving the reflection signal 422 may comprise the LNA 429, the frequency mixer 427, the LPF 425, the ADC 423 and optionally the processing unit 421 and the receive antenna 431.

It can be understood that the transmit antenna 411 and the receive antenna 431 can be implemented as dedicated antennas of an antenna array for the respective transmission path and the reception path of the digitally modulated radar 400. It is further conceivable that the transmit antenna 411 and the receive antenna 431 can be implemented in a single antenna array and the antenna array may be operable in an interchanging manner, e.g., by means of circulators, for the transmission path and the reception path of the digitally modulated radar 400.

The CGU 401 is further configured to communicate with the processing unit 421, in order to provide information regarding the selected code sequence for range processing.

The communication signal is shown as a dashed line 412. It is conceivable that the CGU 401 and the processing unit 421 can be implemented as a single entity, e.g., as a baseband processing unit. Furthermore, additional means for generating and/or processing radar signals, e.g., memory or storage for storing code sequences, control commands etc. as well as interfaces such as user interface, are not explicitly shown but are apparent from the above-described implementation.

As mentioned before, because of the non-ideality of the frequency mixers 407 and 427, the I and Q components may not be exactly in quadrature and, hence, amplitude and/or phase mismatch between the I and Q components may arise. In addition, the non-linearity of the PA 409 further degrades the radar performance by producing range sidelobes or ghosts in the range profiles. The analog radar signal 404 and the filtered baseband signal may suffer from baseband non-linearity in terms of second and/or third order harmonic distortion. The effect of the LNA 429, the frequency mixer 427, the LPF 425, and the ADC 423 may additively result in the receiver DC offset that may act on the reflection signal 422.

Figure 5A:
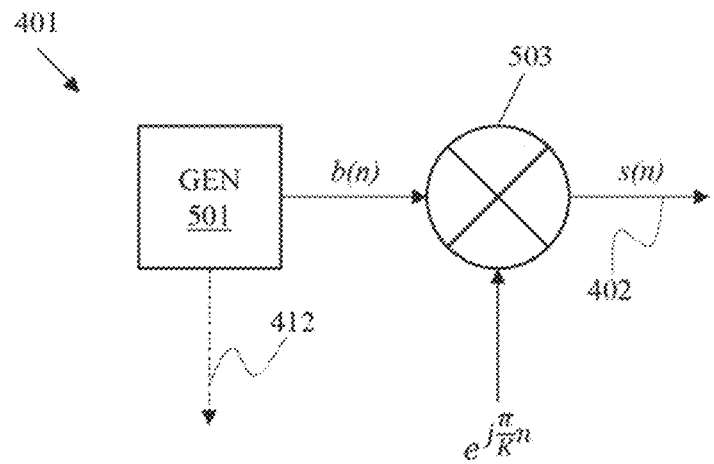
FIG. 5A shows the code generation unit of FIG. 4 in detail, in accordance with example embodiments.
Figure 5B:
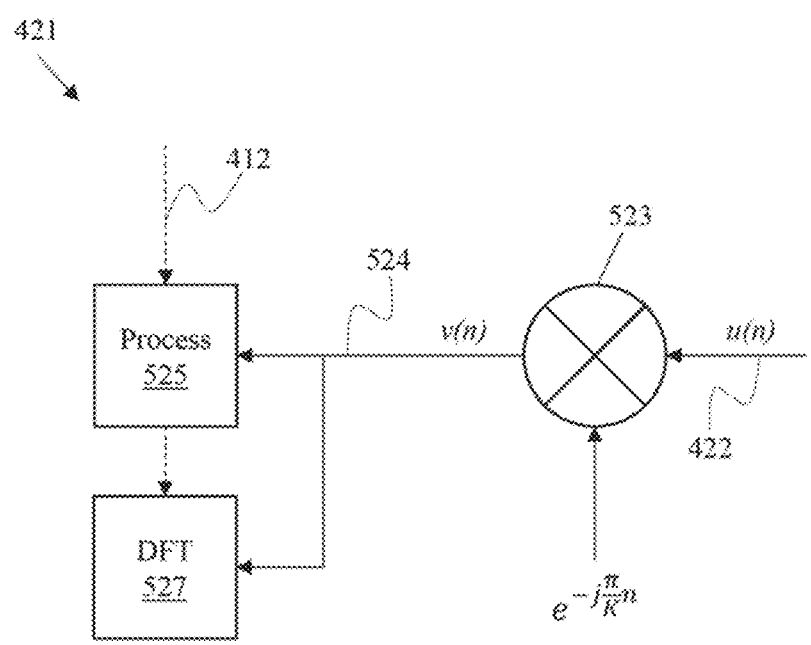
FIG. 5B shows the processing unit of FIG. 4 in detail, in accordance with example embodiments.

Along FIG. 5A and FIG. 5B, the generation of the radar signal 402 in the CGU 401 and the generation of the process input signal 524 in the processing unit 421 are shown in detail. The CGU 401 of FIG. 5A comprises a signal generator 501 that generates chip signals or chips according to a predefined code sequence. Such a code sequence may correspond to the transmission frame as shown in FIG. 2, that comprises a sequence "s" of Lc chips, which is repeated M times, and eventually the M repetition of the "s" is further repeated N times. In other words, the sequence "s" is repeated M·N time in a single transmission frame.

Here, the code sequence is shown as $b_c(n)$, where n defines a discrete time index that corresponds to the code rate. In conventional digitally modulated radars, the code sequence $b_c(n)$ is repeatedly transmitted as the radar signal, i.e., the repeated code sequence $b_c(n)$ is used directly for the successive conversion, filtration, and amplification stages. However, in order to generate the radar signal robust to non-idealities of the transceiver, the code generation unit 401 further comprises a multiplier 503 that multiplies the periodic repetition of $b_c(n)$, herein shown as b(n), with a progressive phase rotation $$e^{j\frac{\pi}{K}\cdot n}.$$

Therefore, the radar signal 402 in terms of the digital code sequence can be expressed as:

$$s(n) = b(n)e^{j\frac{\pi}{K}n} \qquad (7)$$

where b(n) is a periodic repetition of the code sequence $b_c(n)$.

On the other hand, the processing unit 421 receives the reflected signal 422, herein shown as u(n), after baseband conversion as described along FIG. 4. The processing unit 421 comprises a multiplier 523 that multiplies the reflected signal u(n) with a progressive phase rotation $$e^{-j\frac{\pi}{K}\cdot n}.$$

This results in the process input signal 524, herein shown as v(n), which is utilized for subsequent processing. Therefore, the process input signal v(n) can be expressed as:

$$v(n) = u(n)e^{-j\frac{\pi}{K}n} \tag{8}$$

It can be seen that the progressive phase rotation for the reception signal has an opposite rotational angle than the progressive phase rotation for the transmission signal. Hence, the multiplier 523 effectively removes the complex exponential.

The processing unit 421 further comprises a process block 525 that performs range processing of the process input signal 524 with respect to the code sequence $b_c(n)$, e.g., with the help of code sequence information 412 fed from the CGU 401, especially the signal generator 501, thereby generating radar range profiles. The range processing can be based on conventional correlation algorithms (e.g., for PMCW radars) or can be based on frequency domain range processing (e.g., for OFDM radars). The process block 525 further accumulates M consecutive range profiles, i.e., summing M consecutive range bins, in order to remove range sidelobes coming from the non-idealities, which will be described in detail in the latter sections. The accumulation of M consecutive profiles further improves SNR, for instance. The processing unit 421 further comprises a discrete Fourier transformation (DFT) block 527 that performs DFT on N number of samples in order to produce Doppler profiles.

It is to be noted that the processing unit 421 can be implemented by hardware, software, or any combination thereof. The processing unit 421 may include one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the following, the criteria for the parameters Lc, K and M and their effect on range sidelobe reduction, especially due to IQ imbalance, are described in detail.

The reflection signal 422 can be described in the time domain as:

$$u(t) = \alpha y(t) + \beta y^*(t) \tag{9}$$

where y(t) is the reflection signal without IQ imbalance.

Hence, for the ideal case, i.e., when there is no amplitude or phase mismatch between the I and Q branches, $\alpha=1$ and $\beta=0$.

Therefore, for all real values of b(n), an IQ mismatch on the transmission path and/or the reception path will produce range sidelobes such as:

$$v(n) = u(n)e^{-j\frac{\pi}{K}n} = b(n+\Delta)\left[\alpha e^{j\frac{\pi}{K}\Delta} + \beta e^{-j2\pi\frac{n}{K}}e^{-j\frac{\pi}{K}\Delta}\right] \tag{10}$$

where $\Delta$ is the propagation delay.

In equation (10), the first term $$b(n+\Delta)\alpha e^{j\frac{\pi}{K}\Delta}$$

is a delayed version of the code sequence multiplied by a constant phase rotation which depends on the propagation delay $\Delta$. Therefore, the autocorrelation properties of the code sequence are not affected for this first term.

However, the second term $$b(n+\Delta)\beta e^{-j2\pi\frac{n}{K}}e^{-j\frac{\pi}{K}\Delta}$$

is also a delayed version of the code sequence multiplied by both a constant and a progressive phase rotation. In addition, this term also contains a progressive phase rotation $$e^{-j2\pi\frac{n}{K}}.$$

This progressive phase rotation breaks the correlation property of the code sequence. This will result in range sidelobes. However, with a selection criteria for K, the progressive phase rotation will be mitigated during the radar digital processing.

For example, in the case of PMCW radars with real code sequence b(n), the first three range profiles can be expressed as:

$$r_1(D) = \sum_{n=0}^{L_c-1} v(n)b_c(n+D) \tag{11a}$$

$$r_2(D) = \sum_{n=0}^{L_c-1} v(n+L_c)b_c(n+D) \tag{11b}$$

$$r_3(D) = \sum_{n=0}^{L_c-1} v(n+2L_c)b_c(n+D) \tag{11c}$$

where $b_c(n+D)$ is a circular shift in the code sequence $b_c(n)$.

Each range profile $r_k(D)$ is affected by range sidelobes. This can be described as:

$$r_{sl,k}(D) = \sum_{n=0}^{L_c-1} b(n+(k-1)L_c+\Delta)\beta e^{-j2\pi\frac{(n+(k-1)L_c)}{K}}e^{-j\frac{\pi}{K}\Delta}b_c(n+D) \tag{12}$$

where $r_{sl,k}(D)$ contains the range sidelobes from $r_k(D)$.

The equation (12) can be rewritten as:

$$r_{sl,k}(D) = \beta e^{-j2\pi\frac{(k-1)L_c}{K}}e^{-j\frac{\pi}{K}\Delta}\sum_{n=0}^{L_c-1} b_c(n+\Delta)b_c(n+D)e^{-j2\pi\frac{n}{K}} \tag{13}$$

since b(n) is a periodic repetition of $b_c(n)$ that contains Lc samples.

It can be seen that all range profiles will have the same range sidelobes as:

$$r_{sl}(D) = \beta e^{-j\frac{\pi}{K}\Delta}\sum_{n=0}^{L_c-1} b(n+\Delta)b_c(n+D)e^{-j2\pi\frac{n}{K}} \tag{14}$$

which is multiplied by a phase rotation $$e^{-j2\pi\frac{(k-1)Lc}{K}}$$

depending on the range profile index. Therefore, the equation (13) can be written in a simplified form as:

$$r_{sl,k}(D) = e^{-j2\pi\frac{(k-1)Lc}{K}} r_{sl}(D) \quad (15)$$

From the equation (15), it can be summarized that, if Lc is not a multiple of K, the range sidelobe in consecutive range profiles are not in phase and therefore will be attenuated during accumulation.

Furthermore, it can be summarized from equation (15) that, If Lc·M/K is an integer, the phase of the range sidelobes at index D in all M range profiles are equally distributed on the complex circle. Consequently, the accumulation of M consecutive range profiles cancels the range sidelobes as shown in the following equation:

$$\sum_{k=1}^{M} r_{sl,k}(D) = r_{sl}(D) \sum_{k=1}^{M} e^{-j2\pi\frac{(k-1)Lc}{K}} = 0 \quad (16)$$

This can also be extended to complex code sequences as well as OFDM radars as they transmit complex digitally modulated signals. Especially for complex code sequence, it can be seen that the ghosts are represented by $$b^*(n+\Delta)\beta e^{-j2\pi\frac{n}{K}} e^{-j\frac{\pi}{K}\Delta},$$

analogous to equation (10) but with complex operator ( )*, i.e., the complex conjugate of the code sequence. However, they are affected by the same phase rotation in function of K. Therefore, the solution proposed herein can also be used to effectively compensate the range sidelobes produced by IQ imbalance (on the transmitter and receiver side) with complex code sequences.

In the following, the criteria for the parameter K and its effect on range sidelobe reduction, especially due to power amplifier non-linearity, are described in detail. The following technique is valid for binary code sequences, e.g., binary phase modulated radars such as PMCW radars.

Consider the code sequence b(n) as a binary code sequence, which is multiplied by the complex exponential with progressive phase rotation in the digital domain, as described above. This produces the radar signal s(n) as shown in equation (7). The radar signal is then converted in the analog domain and modulates the carrier sinewave.

Generally, the transmission is bandwidth limited, which can be modeled with the LPF 405 with an impulse response h(n). The signal is then amplified through the PA 409. In order to reduce the power consumption for radar signal transmission, the PA 409 is, in an example, operated close to its saturation point. However, this produces non-linear distortion in the transmitted signal, which degrade the radar performances.

The proposed technique creates a waveform able to cancel the most significant sources of range sidelobes. For that reason, the following two hypothesis are developed:

1) The power amplifier non-linear model can be approximated with a cubic model:

$$y(nT_c) = a_1 x(nT_c) + a_3 x(nT_c)|x(nT_c)|^2 \quad (17)$$

This hypothesis is met in practice as the even non-idealities are absent in the baseband power amplifier model and the third order non-linearity is dominating in practice.

2) Only three taps in the LPF discrete impulse response are significant:

$$x(n) = \sum_{k=0}^{2} h(k)s(n-k) \quad (18)$$

As h(n) is a low-pass filter, this assumption is realistic.

The process input signal v(n) contains several terms that are linear combinations of the binary code sequence b(n), which depend on the target location and contain useful information. Other terms depend on non-linear combinations of b(n). The non-linear combinations will produce range sidelobes or ghosts in the range profile. However, for every case, the non-linear combinations are all multiplied by:

$$z(K) = 2\cos\left(\frac{\pi}{K}\right) + e^{j3\frac{\pi}{K}} \quad (19)$$

The values of K for which z(K)=0 will not produce any range sidelobes. At least, the ones produced by the three most significant taps of the impulse response h(n) and the third order non-linearity are cancelled due to the waveform property.

From equation (19), the parameter K cancelling the non-linear combinations of equation (19) can be expressed in a simplified form such as:

$$K = \frac{\pm 3}{1+3d} \quad (20)$$

where d is an integer. Therefore, possible ideal values of K can be expressed as: ±3, ±1.5, and so on.

In the following, the selection criteria for the parameters Lc, K and M to achieve receiver DC offset robustness are described in detail.

In the presence of DC offset, the reflected signal 422 at the ADC 423 output can be described as:

$$u(n) = u_0(n) + \gamma \quad (21)$$

where $u_0(n)$ is the ideal received signal without DC offset, and γ is a complex number that defines the cumulative DC offset in the reception path.

To remove the DC offset, the parameters K, Lc and M are chosen to satisfy the following two criteria:

1) $L_c$ is not a multiple of 2K, and
2)

$$\frac{L_c M}{2K}$$

is an integer.

The attenuation is possible because the pi/K demodulation operation is also applied on the DC offset as follows:

$$v(n) = u(n)e^{-j\frac{\pi}{K}n} = u_0(n)e^{-j\frac{\pi}{K}n} + \gamma e^{-j\frac{\pi}{K}n} \qquad (22)$$

Hence, the phase of the DC offset will change from one range profile to another. With a selective value of K based on the aforementioned criteria, it can be removed during coherent accumulation.

In the following, the selection criteria for the parameters Lc, K and M to achieve baseband non-linearity robustness are described in detail.

In the presence of non-linearity in baseband, all type code sequences will produce range sidelobes and/or ghost targets. This is especially the case with Zadoff code sequences which are very sensitive to the third order harmonic distortions (HD3) in baseband.

Zadoff code sequences are well known complex code sequences defined by:

$$b_c(n) = e^{j\frac{2\pi}{L_c}(n-1)\left(r\frac{L_c-1-n}{2}-q\right)} \qquad (23)$$

Ideally, they produce no range sidelobes. However, in the presence of front-end non-idealities, range sidelobes occur. Especially, they are very sensitive to baseband third order non-linearity.

Based on the impact of the third order harmonic distortions on the Zadoff code sequences, it appears that it is possible to attenuate the range sidelobes produced by this non-linearity. To achieve this, the parameters K, Lc, and M are chosen to satisfy the following two criteria:
1) $2L_c$ is not a multiple of K, and
2)

$$\frac{2L_c M}{K}$$

is an integer.

However, this solution is only valid for Zadoff code sequences since other code sequences do not show such properties.

Figure 6A:
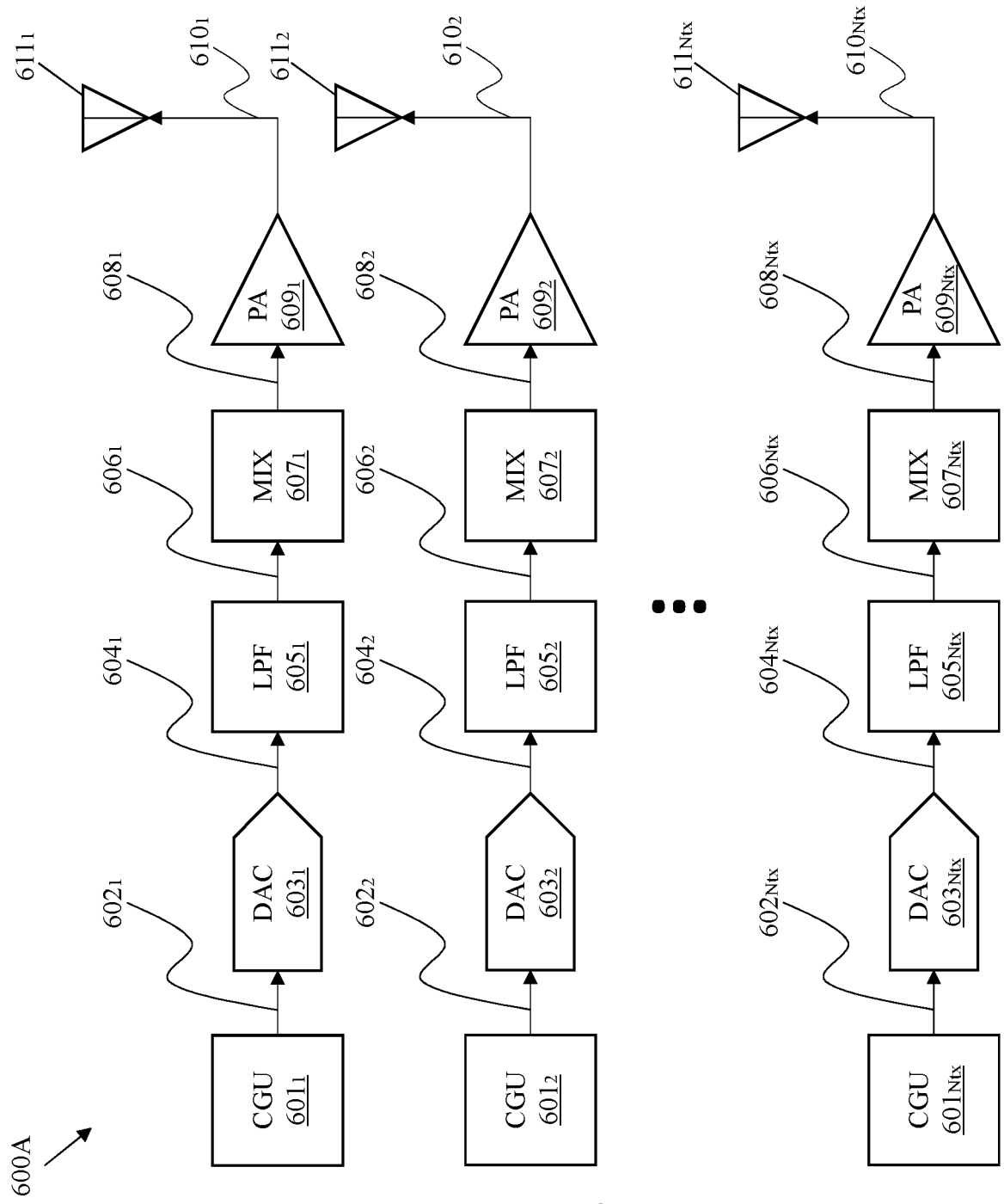
FIG. 6A shows a transmission side for a second embodiment of a radar transceiver according to an aspect of this disclosure, in accordance with example embodiments.
Figure 6B:
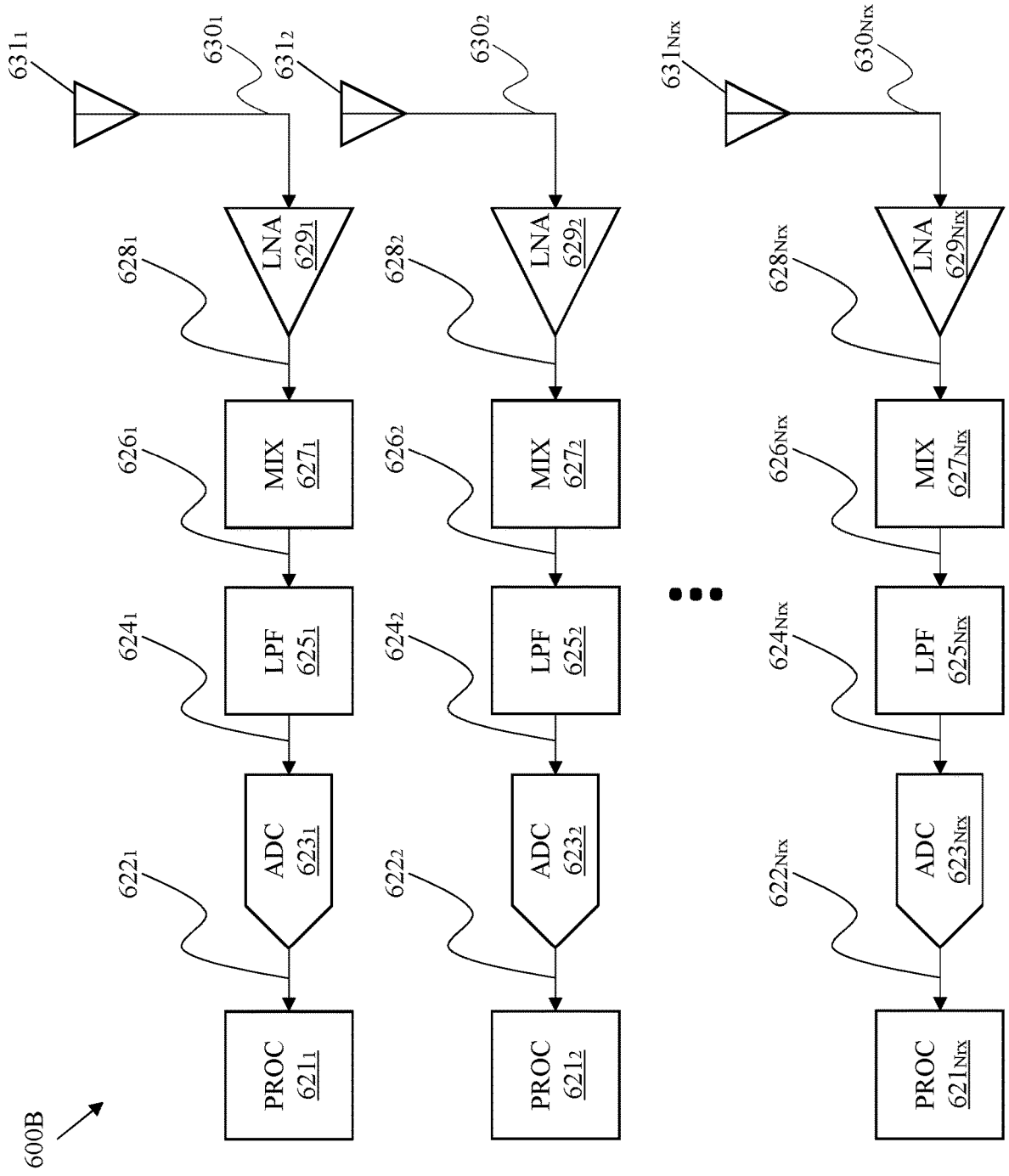
FIG. 6B shows a reception side for a second embodiment of a radar transceiver, in accordance with example embodiments.

Along FIG. 6A and FIG. 6B, a second example embodiment of the digitally modulated radar 600A, 600B according to the second aspect of this disclosure is illustrated. In particular, the digitally modulated radar 600A, 600B is illustrated in terms of a multi-input multi-output (MIMO) implementation. In this context, FIG. 6A illustrates a multi-antenna transmission side 600A and FIG. 6B illustrates a multi-antenna reception side 600B of a MIMO-radar.

In view of FIG. 6A, the transmission side 600A comprises a plurality of transmission paths 1-Ntx. Each of the plurality of transmission paths comprises a code generation unit (CGU) $601_1$-$601_{Ntx}$ that generates a respective radar signal $602_1$-$602_{Ntx}$ in the digital domain. However, it is also conceivable that the CGUs $601_1$-$601_{Ntx}$ can be implemented as a single unit that is operably coupled to each of the plurality of transmission paths and generates the respective radar signal $602_1$-$602_{Ntx}$ for the corresponding transmission paths, either sequentially or simultaneously. The radar signals $602_1$-$602_{Ntx}$ are being identical in terms of the code sequence length and the number of periodic repetitions of the code sequence, however, comprise non-identical progressive phase rotations with respect to each other.

Each of the plurality of transmission paths further comprises a digital-to-analog converter (DAC) $603_1$-$603_{Ntx}$ downstream to the respective CGU $601_1$-$601_{Ntx}$ and converts the respective digital radar signal $602_1$-$602_{Ntx}$ in the analog domain, thereby generating an analog radar signal $604_1$-$604_{Ntx}$ for the respective transmission paths. Each of the plurality of transmission paths further comprises a low pass filter (LPF) $605_1$-$605_{Ntx}$ downstream to the respective DAC $603_1$-$603_{Ntx}$ and performs baseband filtration of the respective analog radar signal $604_1$-$604_{Ntx}$, thereby generating a filtered radar signal $606_1$-$606_{Ntx}$ for the respective transmission paths.

Each of the plurality of transmission paths further comprises a frequency mixer $607_1$-$607_{Ntx}$ downstream to the respective LPF $605_1$-$605_{Ntx}$, and modulates the respective filtered radar signal $606_1$-$606_{Ntx}$ with a carrier sinewave, e.g., generated by a local oscillator (not shown), thereby generating an RF radar signal $608_1$-$608_{Ntx}$ for the respective transmission paths. Each of the plurality of transmission paths moreover comprises a power amplifier (PA) $609_1$-$609_{Ntx}$ and amplifies the respective RF radar signal $608_1$-$608_{Ntx}$, thereby generating a radar transmit signal $610_1$-$610_{Ntx}$ for the respective transmission paths, which is transmitted via a respective transmit antenna $611_1$-$611_{Ntx}$. Therefore, each of the plurality of transmission paths may comprise at least one of each of the DAC, the LPF, the frequency mixer, the PA, and optionally the CGU and the transmit antenna in order to generate and/or to transmit the radar signal.

In view of FIG. 6B, the reception or receiving side 600B comprises a plurality of reception or receiving paths 1-Nrx. Generally, the radar transmit signals from the transmission side 600A are reflected from all targets and the resulting echoes or reflected signals or radar receive signals are received by the reception side 600B. The reception side 600B comprises a plurality of receiving paths 1-Nrx. Each of the plurality of receiving paths comprises an antenna $631_1$-$631_{Nrx}$ and receives a respective radar receive signal $630_1$-$630_{Nrx}$ corresponding to the radar transmit signals $610_1$-$610_{Ntx}$. In practice, only a portion of the transmit signal $610_1$-$610_{Ntx}$ is reflected back to the receive antenna $631_1$-$631_{Nrx}$.

Each of the plurality of receiving paths further comprises a low noise amplifier (LNA) $629_1$-$629_{Nrx}$ and amplifies the respective radar receive signal $630_1$-$630_{Nrx}$, thereby generating an amplified radar receive signal $628_1$-$628_{Nrx}$ for the respective receiving paths. Each of the plurality of receiving paths further comprises a frequency mixer $627_1$-$627_{Nrx}$ downstream to the respective LNA $629_1$-$629_{Nrx}$ and demodulates the respective amplified radar receive signal $628_1$-$628_{Nrx}$ with the carrier signal generated by the local oscillator, thereby generating a baseband signal $626_1$-$626_{Nrx}$ for the respective receiving paths.

Each of the plurality of receiving paths further comprises a low pass filter (LPF) $625_1$-$625_{Nrx}$ downstream to the respective frequency mixer $627_1$-$627_{Nrx}$ and filters the respective baseband signal $626_1$-$626_{Nrx}$, thereby generates a filtered baseband signal $624_1$-$624_{Nrx}$ for the respective receiving paths. Each of the plurality of receiving paths further comprises an analog-to-digital converter (ADC) $623_1$-$623_{Nrx}$ downstream to the respective LPF $625_1$-$625_{Nrx}$ and converts the respective filtered baseband signal $624_1$-$624_{Nrx}$ into the digital domain, thereby generating a reflection signal $622_1$-$622_{Nrx}$ in the digital domain for the respective receiving paths.

Each of the plurality of receiving paths moreover comprises a processing unit $621_1$-$621_{Nrx}$ downstream to the respective ADC $623_1$-$623_{Nrx}$ and generates a process input signal in the digital domain for each receiving path from the respective reflection signal $622_1$-$622_{Nrx}$ in order to perform range and Doppler processing. Therefore, each reception or receiving path for receiving the reflection signal may comprise at least one of each of the LNA, the frequency mixer, the LPF, the ADC and optionally the processing unit and the receive antenna.

It should be understood that the transmit antennas $611_1$-$611_{Nrx}$ and the receive antennas $631_1$-$631_{Nrx}$ can be implemented as dedicated antennas of an antenna array for the respective transmission paths and the receiving paths. It is further conceivable that the transmit antennas $611_1$-$611_{Nrx}$ and the receive antennas $631_1$-$631_{Nrx}$ can be implemented in a single antenna array and the antenna array may be operable in an interchanging manner, e.g., by means of circulators, for the respective transmission paths and the receiving paths.

The CGUs $601_1$-$601_{Ntx}$ of the transmission side 600A may communicate with the respective processing units $621_1$-$621_{Nrx}$ of the reception side 600B in order to provide information regarding the selected code sequence, e.g., for range processing. It is conceivable that the CGUs $601_1$-$601_{Ntx}$ and the processing units $621_1$-$621_{Nrx}$ can be implemented as a single entity, e.g., as a baseband processing unit. Furthermore, additional means for generating and/or processing radar signals, e.g., memory or storage for storing code sequences, control commands etc. as well as interfaces such as user interface, are not explicitly shown but are apparent from the above-described implementation.

Figure 7:
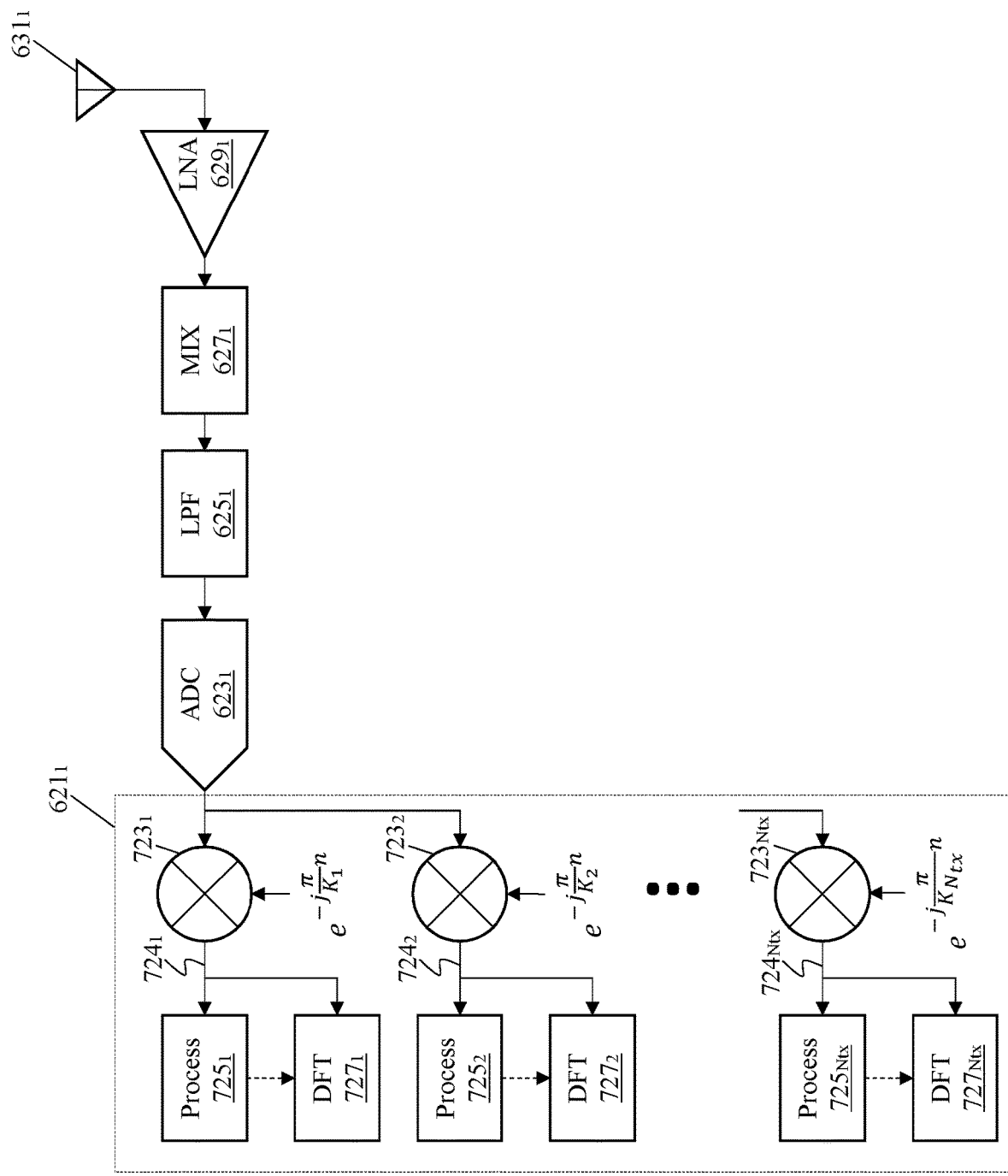
FIG. 7 shows a receiving path of the reception side of FIG. 6B in detail, in accordance with example embodiments.

FIG. 7 shows an example of a receiving path of the reception side 600B in detail. Generally, the CGUs $601_1$-$601_{Ntx}$ each corresponds to the CGU 401 of FIG. 4 and the operation described along FIG. 5A before. Therefore, the operation, particularly the generation of the radar signal by the CGUs $601_1$-$601_{Ntx}$, is not repeated. However, it is to be noted that there may be several possible values for K that satisfy the criteria listed before and each transmission path of the plurality of transmission paths may generate the radar signal with a different value of K, resulting in a different progressive phase rotation for the transmit signals with respect to each other. As such, each receiving path of the plurality of receiving paths should be able to separate signal from each transmission path during coherent accumulation.

In order to achieve this, the processing units $621_1$-$621_{Nrx}$ along the respective receiving paths each comprises a plurality of processing parts, and in an example, a number of processing parts equals to the number of transmission paths in the transmission side 600A. Each of the processing parts comprises at least one multiplier $723_1$-$723_{Ntx}$, followed by at least one process block $725_1$-$725_{Ntx}$ and at least one DFT block $727_1$-$727_{Ntx}$. Each of the multiplier $723_1$-$723_{Ntx}$ multiplies the reflection signal in the digital domain, e.g., the reflection signal $622_1$ along the first receiving path of the reception side 600B, with a progressive phase rotation having a value of K corresponding to a value of K selected at the respective transmission paths.

For example, the first transmission path of the transmission side 600A, i.e., the CGU $601_1$ of the transmission side 600A may select $K_1$ and may generate the radar signal by multiplying the periodic repetition of code sequence with a progressive phase rotation $$e^{j\frac{\pi}{K_1}\cdot n}.$$

In this regard, the multiplier $723_1$ of the first processing part of the first processing unit $621_1$ along the first receiving path multiplies the reflection signal $622_1$ with a progressive phase rotation $$e^{-j\frac{\pi}{K_1}\cdot n},$$

and generates a first process input signal $724_1$.

The process block $725_1$ of the first processing part of the first processing unit $621_1$ along the first receiving path performs range processing of the first process input signal $724_1$, thereby generates radar range profiles. The DFT block $727_1$ of the first processing part of the first processing unit $621_1$ along the first receiving path further performs DFT on N number of samples in order to produce Doppler profiles.

Similarly, the second transmission path of the transmission side 600A, i.e., the CGU $601_2$ of the transmission side 600A may select $K_2$ and may generate the radar signal by multiplying the periodic repetition of code sequence with a progressive phase rotation $$e^{j\frac{\pi}{K_2}\cdot n}.$$

In this regard, the multiplier $723_2$ of the second processing part of the first processing unit $621_1$ along the first receiving path multiplies the reflection signal $622_1$ with a progressive phase rotation $$e^{-j\frac{\pi}{K_2}\cdot n},$$

and generates a second process input signal $724_2$.

The process block $725_2$ of the second processing part of the first processing unit $621_1$ along the first receiving path performs range processing of the second process input signal $724_2$, thereby generates radar range profiles. The DFT block $727_2$ of the second processing part of the first processing unit $621_1$ along the first receiving path further performs DFT on N number of samples in order to produce Doppler profiles.

The above-mentioned signal processing scheme is analogously carried out for all the processing parts of the first processing unit $621_1$ along the first receiving path, and in an example, simultaneously. Furthermore, the above-mentioned signal processing scheme is also carried out analogously for each of the processing units $621_1$-$621_{Nrx}$ of the respective receiving paths of the reception side 600B, either sequentially or simultaneously.

However, the above-mentioned signal processing scheme is applicable if the relation between the different values of K follows the following criteria:

$$\sum_{m=0}^{M-1} e^{jn\left(\frac{1}{K_p}-\frac{1}{K_q}\right)\frac{mL_c}{M}} = 0 \quad (24)$$

where $K_p$ is an integer or a non-integer for a first transmission path of the plurality of transmission paths and $K_q$ is an integer or a non-integer for a second transmission path of the plurality of transmission paths.

In other words, two different transmission paths of the plurality of transmission paths (e.g., defined with indexes p and q) are orthogonal if their respective parameters $K_p$ and $K_q$ satisfy the condition stated in equation (24).

Generally, this solution can orthogonalize up to a number of M transmission paths or transmitters. However, in practice, the number of transmission paths Ntx which can be orthogonalized is smaller than M. Hence, if it is required to implement less than Ntx transmitters, another MIMO mode (e.g., time Domain MIMO) can be combined, since the pi/K modulation scheme already provides MIMO capabilities if the number of accumulations M is large enough. However, if a large number of transmission paths or transmitters is required to be implemented, the value of M can be increased accordingly or the pi/K modulation scheme can be combined with another MIMO mode.

In the following, different implementations of the MIMO scheme are presented based on the type of the code sequences or modulation schemes that can be used in different DMRs.

A) Zadoff Code Sequences

The following steps are performed to obtain a suitable value of K in order to achieve IQ imbalance robustness, DC offset robustness, and baseband HD3 robustness while providing MIMO capabilities in PMCW radars.

Step 1: Choose up to M integers $A_p$ such that:

$$A_p \neq a\frac{M}{4} \forall p \qquad (25)$$

where $a \in \mathbb{Z}$.

Step 2: To benefit from the MIMO capabilities, the following constraints are to be met $$\begin{cases} A_p \neq A_q + bM & \forall p, q \quad b \in \mathbb{Z} \\ A_p \neq -A_q + cM & \forall p, q \quad c \in \mathbb{Z} \\ A_p \neq -3A_q + dM & \forall p, q \quad d \in \mathbb{Z} \end{cases} \qquad (26)$$

Step 3: Select the parameter K such that:

$$K_p = \frac{ML_c}{2A_p} \qquad (27)$$

B) Binary Code Sequences

The following steps are performed to obtain a suitable value of K in order to achieve IQ imbalance robustness, DC offset robustness, and power amplifier non-linearity robustness while providing MIMO capabilities in PMCW radars.

Step 1: Compute up to M integers $A_p$ such that:

$$A_p = \frac{MLc}{2}\left(\pm\frac{1}{3} + d\right) \qquad (28)$$

where d is an integer.

Step 2: Only keep the values of $A_p$ which satisfy the following conditions:

$$A_p \neq a\frac{M}{2} \forall p \qquad (29)$$

where $a \in \mathbb{Z}$.

Step 3: To benefit from the MIMO capabilities, the following constraints are to be met $$\begin{cases} A_p \neq A_q + bM & \forall p, q \quad b \in \mathbb{Z} \\ A_p \neq -A_q + cM & \forall p, q \quad c \in \mathbb{Z} \end{cases} \qquad (30)$$

Step 4: Select the parameter K according to equation (27).

C) Other Code Sequences

The following steps are performed to obtain a suitable value of K in order to achieve IQ imbalance robustness and DC offset robustness while providing MIMO capabilities in all types of DMRs.

Step 1: Choose up to M integers $A_p$ such that:

$$A_p \neq a\frac{M}{2} \forall p \qquad (31)$$

where $a \in \mathbb{Z}$.

Step 2: To benefit from the MIMO capabilities, the following constraints are to be met $$\begin{cases} A_p \neq A_q + bM & \forall p, q \quad b \in \mathbb{Z} \\ A_p \neq -A_q + cM & \forall p, q \quad c \in \mathbb{Z} \end{cases} \qquad (32)$$

Step 3: Select the parameter K according to equation (27).

Some examples of combinations for the parameters Lc, K and M based on the type of code sequences used are shown in the following table:

| Code type | Lc | M | Value of K for each Tx | Numbers of Txs |
|---|---|---|---|---|
| BPSK | 511 | 6 | 3, 1.5 | 2 |
| Zadoff | 544 | 7 | 14, 3.0464 | 2 |
| Other | 544 | 7 | 9.52, 5.95, 3.71875 | 3 |

For instance, for the binary code sequence (BPK) length Lc of 511, six consecutive range profiles, i.e., M, are needed to be accumulated and the value of K for each transmission path or transmitter is needed to be defined as 3 or 1.5. This particular combination allows the generation of the radar signal robust to IQ imbalance, DC offset robustness, and power amplifier non-linearity. In case the Zadoff code sequences are used, a Zadoff code sequence length Lc of 544 requires seven consecutive range profiles are needed to be accumulated, where the value of K for each transmission path or transmitter is needed to be defined as 14 or 3.0464.

It is further to be noted that the number of transmission paths or transmitters which can be orthogonalized is always smaller than M. This is due to the difficulty of computing M number of values of K that satisfy the MIMO criterion and all other criteria simultaneously. Further, for the Zadoff code sequences, seven consecutive range profiles, i.e., M=7, are selected for MIMO implementation with two orthogonal transmission paths or transmitters. However, in SISO implementation, several solutions for M=3 can be obtained.

For code sequences, except for the BPSK and Zadoff code sequences, at least five consecutive range profiles, i.e., M=5, are selected for two orthogonal transmission paths or transmitters. However, if three orthogonal transmission paths or transmitters are implemented, at least seven consecutive range profiles. i.e., M=7, are needed to be accumulated.

In other words, for code sequences, except for the BPSK and Zadoff code sequences, it is possible to implement three orthogonal transmitters with M=7 code sequence repetitions. However, with Zadoff code sequences, the number of orthogonal transmitters is limited to two with the same number of code repetitions. This is because those latter also benefit from the HD3 robustness, which adds more constraints on the possible values of K.

Figure 8A:
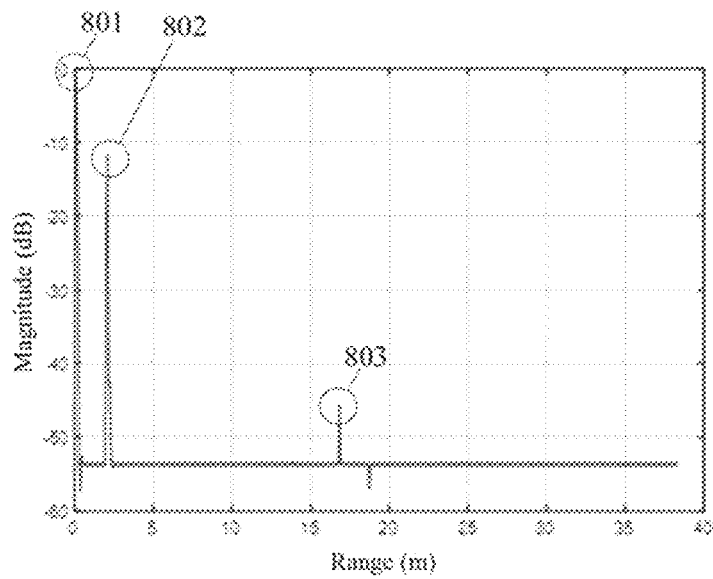
FIG. 8A shows an M-sequence range profile after accumulation for a sequence length of 511 with pi/2-BPSK modulation, in accordance with example embodiments.
Figure 8B:
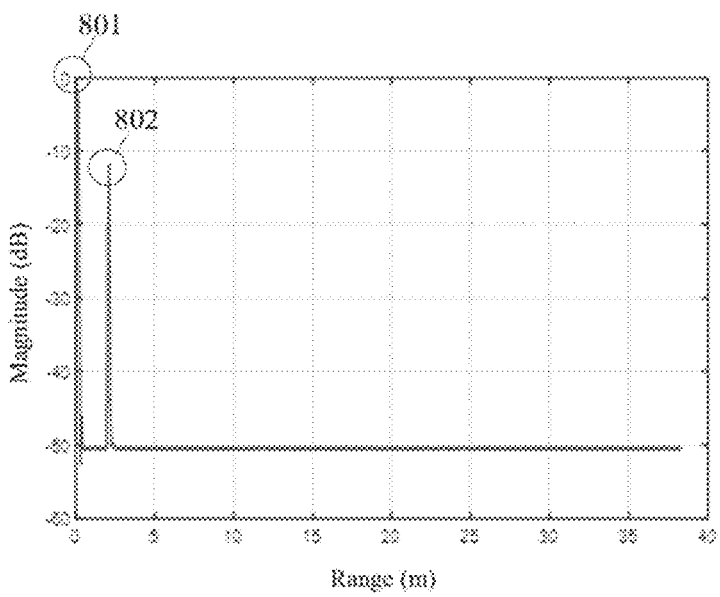
FIG. 8B shows an M-sequence range profile after accumulation for a sequence length of 511 with pi/3-BPSK modulation, in accordance with example embodiments.

Along FIG. 8A and FIG. 8B, range profiles for the M-sequence code sequence with a code sequence length 511 for different modulation techniques are illustrated. Especially for M-sequence, the range sidelobes come from the limitation of the code sequence itself as it is known in the art that M-sequence produces ghost targets if they are affected by amplifier non-linearity.

FIG. 8A shows the range profile with two targets 801, 802 after accumulation, especially for the M-sequence code sequence with a code sequence length 511 for pi/2 binary phase shift keying (pi/2-BPSK) modulation known in the art. The range profile is simulated for a SISO implementation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated around −55 dB, however affected by amplifier non-linearity and produces ghost targets as indicated at the peak 803.

FIG. 8B shows the range profile with two targets 801, 802 after accumulation, especially for the M-sequence code sequence with a code sequence length 511 according to the proposed solution. The range profile is simulated for a SISO implementation. Here, the value of K is selected as 3, the value of M is selected as 3, and is implemented with binary phase shift keying (pi/3-BPSK) modulation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated around −50 dB, and no ghost targets are present, which indicates the robustness to amplifier non-linearity. Therefore, the proposed solution, e.g., as exemplified herein as pi/3-BPSK modulation technique, is superior in terms of ghost target suppression in comparison with conventional techniques.

Figure 9:
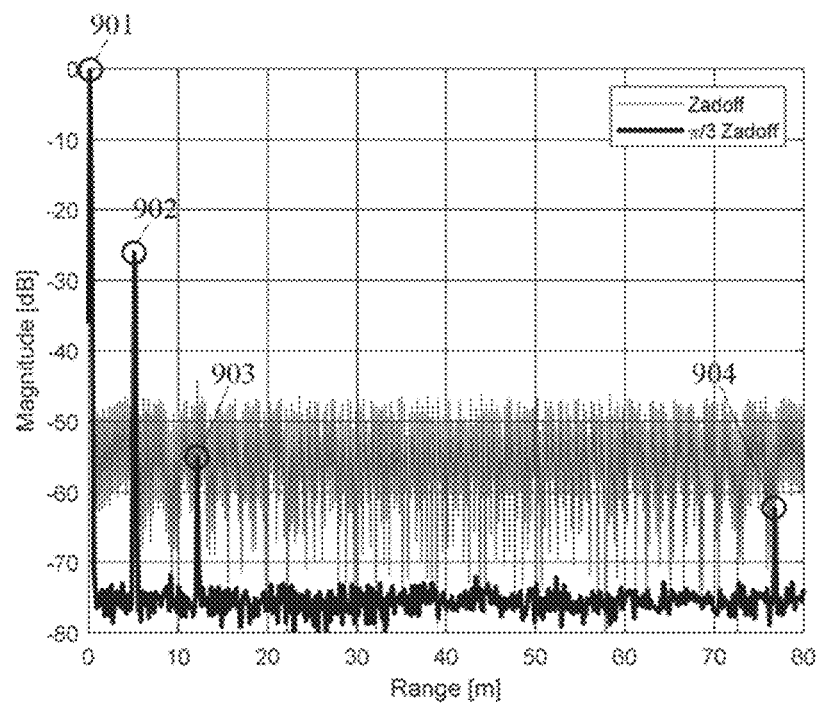
FIG. 9 shows a range profile from a Zadoff code sequence with three targets in the presence of front-end non-idealities, in accordance with example embodiments.

FIG. 9 shows a range profile from a Zadoff code sequence with three targets 901, 902, and 903 in the presence of front-end non-idealities. The range profile is simulated for a SISO implementation. The horizontal axis denotes the range of the targets 901, 902, and 903 in meters and the vertical axis denotes the reflected power magnitude in decibels. The light lines correspond to a range profile from a conventional Zadoff code sequence and the dark lines correspond to a range profile from a Zadoff code sequence with pi/3 modulation according to a solution presented in this disclosure.

As it can be seen, for the range profile from the conventional Zadoff code sequence, the front-end non-idealities produce significant range sidelobes. Hence, the third target 903 approximately at 12 m is not visible. However, with the pi/K modulation, i.e., for the pi/3-Zadoff according to a solution presented in this disclosure, the range sidelobes are much lower, and the third target 903 approximately at 12 m is clearly visible. Therefore, the proposed solution, e.g., as exemplified herein as pi/3-Zadoff, is superior in terms of sidelobe suppression in comparison with conventional techniques.

In addition, the range profile from the pi/3-Zadoff also shows a correlation peak 904 approximately at 75 m. This is a ghost target also due to front-end non-idealities. Unfortunately, a sole implementation of the proposed pi/K modulation is not able to remove it. However, this can be overcome by combining the pi/K modulation with other solutions known in the art without much of difficulty or effort.

Therefore, the solution proposed in this disclosure addresses the problem of front-end non-idealities, namely IQ imbalance, power-amplifier non-linearity, receiver DC offset, and particularly the third order harmonic distortions in baseband, in digitally modulated radars such as PMCW and OFDM radars, along with providing MIMO capabilities. Although the solution proposed in this disclosure is described for continuous transmission radars (CW) such as PMCW and OFDM radars, the presented method and the underlying technique can also be used in pulsed radars with intra-pulse modulation.

Generally, in these radars, by carefully selecting the waveform sequence and the algorithms for building the radar data cube, an almost ideal ambiguity function can be achieved. However, transceiver non-idealities such as non-linearity, phase noise, IQ imbalance, and so on, may create a degradation of the ambiguity function that manifests itself by a raise of the range sidelobes and/or the appearance of ghost targets. Range sidelobe degradation translates into a reduced sensitivity and ghost targets translate into false alarms; hence, both are to be avoided as much as possible.

It is important to note that, in the description as well as in the claims, the word "comprising" does not exclude other elements or steps and the indefinite article "a" or "an" does not exclude a plurality. A single element or other unit may fulfill the functions of several entities or items recited in the claims. Moreover, the disclosure with regard to any of the aspects is also relevant with regard to the other aspects of the disclosure.

Although aspects have been illustrated and described with respect to one or more implementations, equivalent alterations and modifications will occur to others skilled in the art upon the reading and understanding of this specification and the annexed drawings. For example, mathematical expressions recited in the claims may be expressed differently or modified in various minor ways without departing from the spirt and scope of the claims. Such modifications are understood to fall within the scope of the claims. In addition, while a particular feature may have been disclosed with respect to only one of several implementations, such a feature may be combined with one or more other features of the other implementations as may be desired for any given or particular application.

What is claimed is:

1. A method for facilitating robust radar detection comprising:

generating a radar signal in a digital domain along at least one transmission path, the radar signal comprises a number of M periodic repetitions of a code sequence with a length Lc, multiplied with a progressive phase rotation $$e^{j\frac{\pi}{K}\cdot n},$$

where Lc and M are integers, K is an integer or a non-integer, and n is a discrete time index corresponding to a code rate; and generating a process input signal in the digital domain along at least one receiving path from a digitized reflection signal corresponding to the radar signal by multiplying the digitized reflection signal with a progressive phase rotation $$e^{-j\cdot\frac{\pi}{K}\cdot n},$$

wherein K is defined such that a ratio $$\frac{Lc}{2\cdot K}$$

is a non-integer, and M is defined such that a ratio $$\frac{Lc\cdot M}{2\cdot K}$$

is an integer, or
wherein K is defined such that a ratio $$\frac{2\cdot Lc}{K}$$

is a non-integer, and M is defined such that a ratio $$\frac{2\cdot Lc\cdot M}{K}$$

is an integer, if the code sequence is a Zadoff code sequence.

2. The method according to claim 1,
wherein the method further comprises defining K such that a ratio $$\frac{Lc}{K}$$

is a non-integer and defining M such that a ratio $$\frac{Lc\cdot M}{K}$$

is an integer.

3. The method according to claim 2,
wherein, if the code sequence corresponds to a binary code sequence, the method further comprises defining K as an integer or a non-integer given by:

$$K=\frac{\pm 3}{1+3d}$$

where d is an integer.

4. The method according to claim 3,
wherein the method further comprises performing digital processing of the process input signal with respect to the code sequence in order to generate a succession of range profiles.

5. The method according to claim 4,
wherein the method further comprises accumulating a number of M consecutive range profiles.

6. The method according to claim 5,
wherein the method further comprises generating a plurality of the radar signals in the digital domain along a plurality of transmission paths, each of the radar signals comprises an identical code sequence length, an identical number of periodic repetitions of the code sequence, and a non-identical progressive phase rotation with respect to the plurality of the radar signals, whereby each of the transmission paths is associated with a dedicated radar signal of the plurality of the radar signals, and
wherein an orthogonality between the radar signals of each of two of the corresponding plurality of transmission paths is satisfied by:

$$\sum_{m=0}^{M-1} e^{jn\left(\frac{1}{K_p}-\frac{1}{K_q}\right)\frac{mL_c}{M}}=0$$

where $K_p$ is an integer or a non-integer for a first transmission path and $K_q$ is an integer or a non-integer for a second transmission path.

7. The method according to claim 6,
wherein the method further comprises generating a plurality of the process input signals in the digital domain along a plurality of receiving paths, each of the receiving paths being associated with a process input signal generated from a digitized reflection signal corresponding to the respective dedicated radar signals of the plurality of transmission paths.

8. The method according to claim 1,
wherein, if the code sequence corresponds to a binary code sequence, the method further comprises defining K as an integer or a non-integer given by:

$$K=\frac{\pm 3}{1+3d}$$

where d is an integer.

9. The method according to claim 1,
wherein the method further comprises performing digital processing of the process input signal with respect to the code sequence in order to generate a succession of range profiles.

10. The method according to claim 9,
wherein the method further comprises accumulating a number of M consecutive range profiles.

11. The method according to claim 10,
wherein the method further comprises generating a plurality of the radar signals in the digital domain along a plurality of transmission paths, each of the radar signals comprises an identical code sequence length, an identical number of periodic repetitions of the code sequence, and a non-identical progressive phase rotation with respect to the plurality of the radar signals, whereby each of the transmission paths is associated with a dedicated radar signal of the plurality of the radar signals, and wherein an orthogonality between the radar signals of each of two of the corresponding plurality of transmission paths is satisfied by:

$$\sum_{m=0}^{M-1} e^{j\pi\left(\frac{1}{K_p} - \frac{1}{K_q}\right)\frac{mL_c}{M}} = 0$$

where $K_p$ is an integer or a non-integer for a first transmission path and $K_q$ is an integer or a non-integer for a second transmission path.

12. The method according to claim 11,
wherein the method further comprises generating a plurality of the process input signals in the digital domain along a plurality of receiving paths, each of the receiving paths being associated with a process input signal generated from a digitized reflection signal corresponding to the respective dedicated radar signals of the plurality of transmission paths.

13. A digitally modulated radar for facilitating robust radar detection comprising:

at least one code generation unit configured to generate a radar signal in a digital domain along at least one transmission path, the radar signal comprises a number of M periodic repetitions of a code sequence with a length Lc, multiplied with a progressive phase rotation $$e^{j\frac{\pi}{K}\cdot n},$$

where Lc and M are integers, K is an integer or a non-integer, and n is a discrete time index corresponding to a code rate; and at least one processing unit configured to generate a process input signal in the digital domain along at least one receiving path from a digitized reflection signal corresponding to the radar signal by multiplying the digitized reflection signal with a progressive phase rotation $$e^{-j\frac{\pi}{K}\cdot n},$$

wherein the at least one code generation unit is further configured to define K such that a ratio $$\frac{Lc}{2\cdot K}$$

is a non-integer, and to define M such that a ratio $$\frac{Lc\cdot M}{2\cdot K}$$

is an integer, or
wherein the at least one code generation unit is further configured to define K such that a ratio $$\frac{2\cdot Lc}{K}$$

is a non-integer, and to define M such that a ratio $$\frac{2\cdot Lc\cdot M}{K}$$

is an integer, if the code sequence is a Zadoff code sequence.

14. The digitally modulated radar according to claim 13,
wherein the at least one code generation unit is further configured to define K such that a ratio $$\frac{Lc}{K}$$

is a non-integer, and to define M such that a ratio $$\frac{Lc\cdot M}{K}$$

is an integer.

15. The digitally modulated radar according to claim 13,
wherein, if the code sequence corresponds to a binary code sequence, the at least one code generation unit is further configured to define K as an integer or a non-integer given by:

$$K = \frac{\pm 3}{1+3d}$$

where d is an integer.

16. The digitally modulated radar according to claim 13,
wherein the at least one processing unit is further configured to perform digital processing of the process input signal with respect to the code sequence in order to generate a succession of range profiles.

17. The digitally modulated radar according to claim 16,
wherein the at least one processing unit is further configured to accumulate a number of M consecutive range profiles.

18. The digitally modulated radar according to claim 13,
wherein the at least one code generation unit is configured to define Lc with respect to the maximum unambiguous range of the radar for the code rate.

19. The digitally modulated radar according to claim 13,
wherein the digitally modulated radar further comprises a plurality of transmission paths, each of the transmission paths comprises the at least one code generation unit, and wherein for each of the transmission paths, the respective code generation unit is configured to generate a dedicated radar signal in the digital domain having an identical code sequence length, an identical number of periodic repetitions of the code sequence, and a non-identical progressive phase rotation with respect to the plurality of transmission paths, and wherein an orthogonality between the radar signals of each of two of the corresponding plurality of transmission paths is satisfied by:

$$\sum_{m=0}^{M-1} e^{j\pi\left(\frac{1}{K_p}-\frac{1}{K_q}\right)\frac{mL_c}{M}} = 0$$

where $K_p$ is an integer or a non-integer for a first transmission path and $K_q$ is an integer or a non-integer for a second transmission path.

20. The digitally modulated radar according to claim 19, wherein the digitally modulated radar further comprises a plurality of receiving paths, each of the receiving paths comprises the at least one processing unit, and wherein for each of the receiving paths, the respective processing unit is configured to generate a process input signal in the digital domain from a digitized reflection signal corresponding to the respective dedicated radar signals of the plurality of transmission paths.

\* \* \* \* \*